US000001907H

United States Statutory Invention Registration [19]

[11] Reg. Number: H1,907

[45] Published: Nov. 7, 2000

Cameron et al.

[54] APPARATUS FOR INITIATING FATIGUE RELATED DAMAGE ON A MEMBER

[75] Inventors: Alastair Cameron, Cambridge, United Kingdom; David A. Cusac, East Peoria; Marcel R. Hanard, II, Dunlap, both of Ill.

[73] Assignee: Caterpillar Inc., Peoria, Ill.

[21] Appl. No.: 09/204,762

[22] Filed: Dec. 2, 1998

[51] Int. Cl.[7] ..... G01N 3/20

[52] U.S. Cl. ..... 73/849; 73/760; 73/781

[56] References Cited

U.S. PATENT DOCUMENTS

| | | | |
|---|---|---|---|
| 3,731,386 | 5/1973 | Kreiensen et al. | 31/1 PT |
| 3,805,036 | 4/1974 | Michaud et al. | 235/151.32 |
| 4,791,575 | 12/1988 | Watts, Jr. et al. | 364/474.36 |
| 5,140,534 | 8/1992 | Miller et al. | 364/560 |
| 5,156,053 | 10/1998 | Shiraaishi et al. | 73/849 |
| 5,370,364 | 12/1994 | Kenmoku et al. | 251/368 |
| 5,508,944 | 4/1996 | Danielli | 364/560 |
| 5,557,970 | 9/1996 | Abbate et al. | 73/597 |
| 5,592,906 | 1/1997 | Kreuter et al. | 123/90.16 |
| 5,659,873 | 8/1997 | Seyrkammer | 419/29 |
| 5,715,429 | 2/1998 | Takizawa et al. | 395/500 |

*Primary Examiner*—Harold J. Tudor
*Attorney, Agent, or Firm*—Kathleen M. Ryan; Calvin E. Glastetter

[57] ABSTRACT

Apparatus is disclosed for initiating fatigue related damage on a circumferential surface of a rotatable member resultant from application of a tensile stress condition and a superimposed contact stress condition. The apparatus includes structure for supporting the member for axial rotation, structure for applying a load to the member during the rotation thereof to create a bending moment at a predetermined axial location along the member and a resultant tensile stress condition on a circumferential surface thereof at a corresponding location. The apparatus further includes structure for creating a contact stress on the circumferential surface of the member at the predetermined location.

10 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR INITIATING FATIGUE RELATED DAMAGE ON A MEMBER

TECHNICAL FIELD

This invention relates generally to apparatus for initiating fatigue related damage on a member, and more particularly, to apparatus for initiating damage such as pitting and the like on a surface of a member resulting from the simultaneous occurrence of stress related to a bending moment and a superimposed contact stress.

BACKGROUND ART

Currently, known apparatus for initiating fatigue related pitting and other damage and distress on surfaces of members such as test specimens for gears, shafts, and other components, include geared roller test machines operable using a sliding and rolling action. However, the sliding and rolling action has been found to be less than satisfactory as a tool for determining the onset of fatigue related surface damage for purposes such as developing optimal surface properties, qualification of materials and the like, where the component is to be simultaneously subject to a stress condition resulting from a bending moment and a superimposed contact stress.

Accordingly, the present invention is directed to overcoming the problems as set forth above.

DISCLOSURE OF THE INVENTION

In one embodiment of the present invention apparatus for initiating fatigue related damage such as pitting and the like on a circumferential surface extending around an axis of a member is disclosed. The present apparatus includes structure for supporting the member for rotation about the axis, structure for applying a load to the member during the rotation thereof to create a bending moment at a predetermined axial location on the member and a resultant tensile stress condition at a predetermined location on the circumferential surface thereof. The apparatus further includes structure for creating a contact stress at the predetermined location on the circumferential surface of the member, including a member having a circumferential surface positioned for rotating contact with the circumferential surface of the first named member at the predetermined location, and structure biasing the second named member against the first named member during the rotating contact.

According to a preferred embodiment, the member is a shaft supported at one end by a plurality of bearings and is rotated by a motor. The load is applied adjacent an opposite end of the shaft such that the bending moment and the tensile stress condition are concentrated at an intermediate location along the shaft adjacent the last of the bearings. The preferred structure for creating the contact stress includes a ball biased against the predetermined location on the circumferential surface of the shaft by fluid under pressure, which fluid is preferably a oil and serves as a lubricant for the rotating contact.

BRIEF DESCRIPTION OF THE DRAWINGS

For a better understanding of the present invention, reference may be made to the accompanying drawings in which.

BEST MODE FOR CARRYING OUT THE INVENTION

Figure 1:
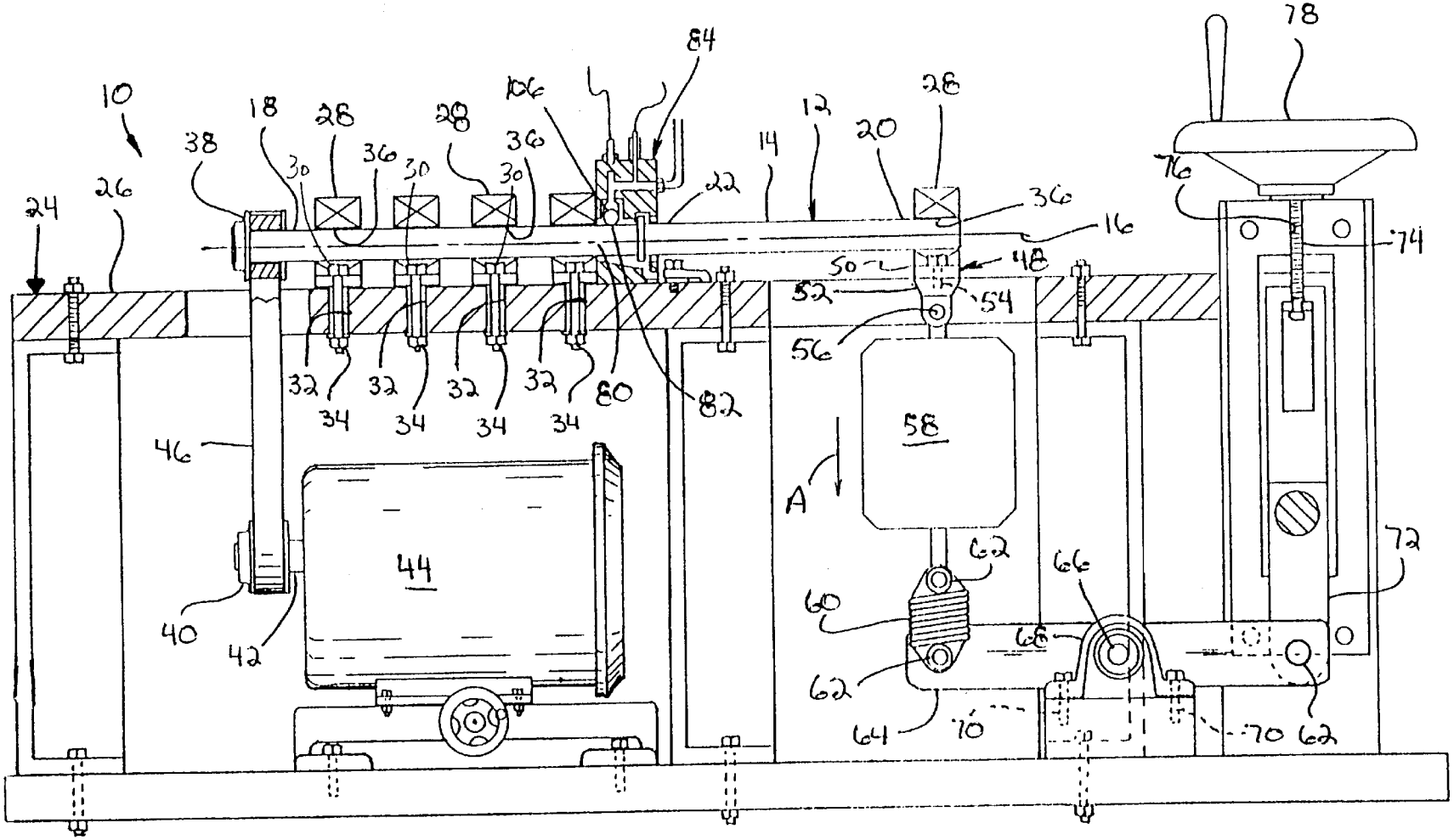
FIG. 1 is a side view in partial cross-section of apparatus for initiating the onset of fatigue related damage according to the present invention.

Referring now to the drawings, the numeral 10 in FIG. 1 identifies apparatus for initiating the onset of fatigue related damage constructed and operable according to the teachings of the present invention. Apparatus 10 is shown in association with a member 12 which is an elongated shaft having a cylindrical shaped outer circumferential surface 14 extending around a central axis 16, on which circumferential surface 14 the onset of the fatigue related damage is to be initiated during rotation of the member by apparatus 10. Member 12 further includes a first axial end portion 18, an opposite second axial end portion 20, and an intermediate portion 22 located therebetween. Member 12 is contemplated to be made from a metallic material having a composition, surface hardness, and other properties for which the period of time before initiation of the onset of fatigue related damage and other information is desired to be determined.

Apparatus 10 includes a structure 24 for supporting member 12 for rotation about axis 16. Structure 24 includes a rigid frame 26 on which a plurality of bearings 28 are rigidly mounted using suitable means, such as bolts 30 which pass through holes 32 in structure 24 and are secured in position using nuts 34 in the conventional manner. Each bearing 28 is of conventional, commercially available construction and includes a central passage 36 therethrough adapted for cooperatively receiving member 12 in rotatable supportive relation thereto, passages 36 of the bearings being aligned about axis 16 of member 12 as shown. Structure 24 further includes a first pulley 38 mounted about first axial end portion 18 of member 12 for rotation therewith, a second pulley 40 mounted to an output shaft 42 of a drive motor 44, and an endless belt 46 encircling first pulley 38 and second pulley 40, to allow rotation of member 12 about axis 16 by motor 44 in the conventional manner when energized by a suitable power source such as electricity or the like.

Apparatus 10 further includes structure 48 for applying a load to member 12 during the rotation thereof to create a bending moment at a predetermined axial location along the member and a resultant tensile stress condition on circumferential surface 14 thereof. The preferred structure 48 includes a bearing link assembly 50 including a bearing 28 mounted to a link 52 with at least one bolt 54, bearing 28 having a hole 36 therethrough for cooperatively receiving member 12 for rotation relative to link 52. Link 52 in turn is pivotally connected by a pin 56 to one end of a load cell 58, the opposite end of which load cell is pivotally connected to one end of a spring link 60 with a pin 62. Spring link 60 is pivotally connected at its opposite end to one end of a pivot arm 64 with a second pin 62. Pivot arm 64 is pivotally connected to frame 26 with a pin 66 extending through pillow block bearings 68 bolted to the frame with bolts 70. Additionally, pivot arm 64 is pivotally connected with a third pin 62 to one end of a draw link 72, draw link 72 having an opposite end threadedly engaged with a feed screw 74 mounted for rotation in an aperture 76 through a portion of frame 26. Feed screw 74 is mounted to a hand wheel 78 for rotation therewith, hand wheel 78 being manually or otherwise rotatable to apply a tensile force to draw link 72, which tensile force is transmitted through third pin 62 to pivot arm 64, and through pivot arm 64 to second pin 62 to spring link 60. The tensile force as denoted by arrow A is then transmitted through spring link 60 and first pin 62 to load cell 58, and through load cell 58 and pin 56 to bearing link assembly 50 of structure 48 so as to be applied to member 12 to create a desired bending moment at a predetermined axial location along member 12. Here, bearings 28 in supportive relation to member 12 are located between first end portion 18 and intermediate portion 22 thereof, such that the desired bending moment will be present at an axial location 80 in close proximity to the bearing 28 closest to intermediate portion 22 of member 12. This arrangement also causes a desired resultant tensile stress condition to be present on circumferential surface 14 of member 12 at a location 82 generally corresponding axially with axial location 80. Here also, it should be noted and understood that location 82 is a fixed location and that circumferential surface 14 will rotate through that location such that the various circumferential portions of surface 14 around axis 16 at axial location 80 will be cyclically subject to the tensile stress condition when they rotate through location 82.

Figure 2:
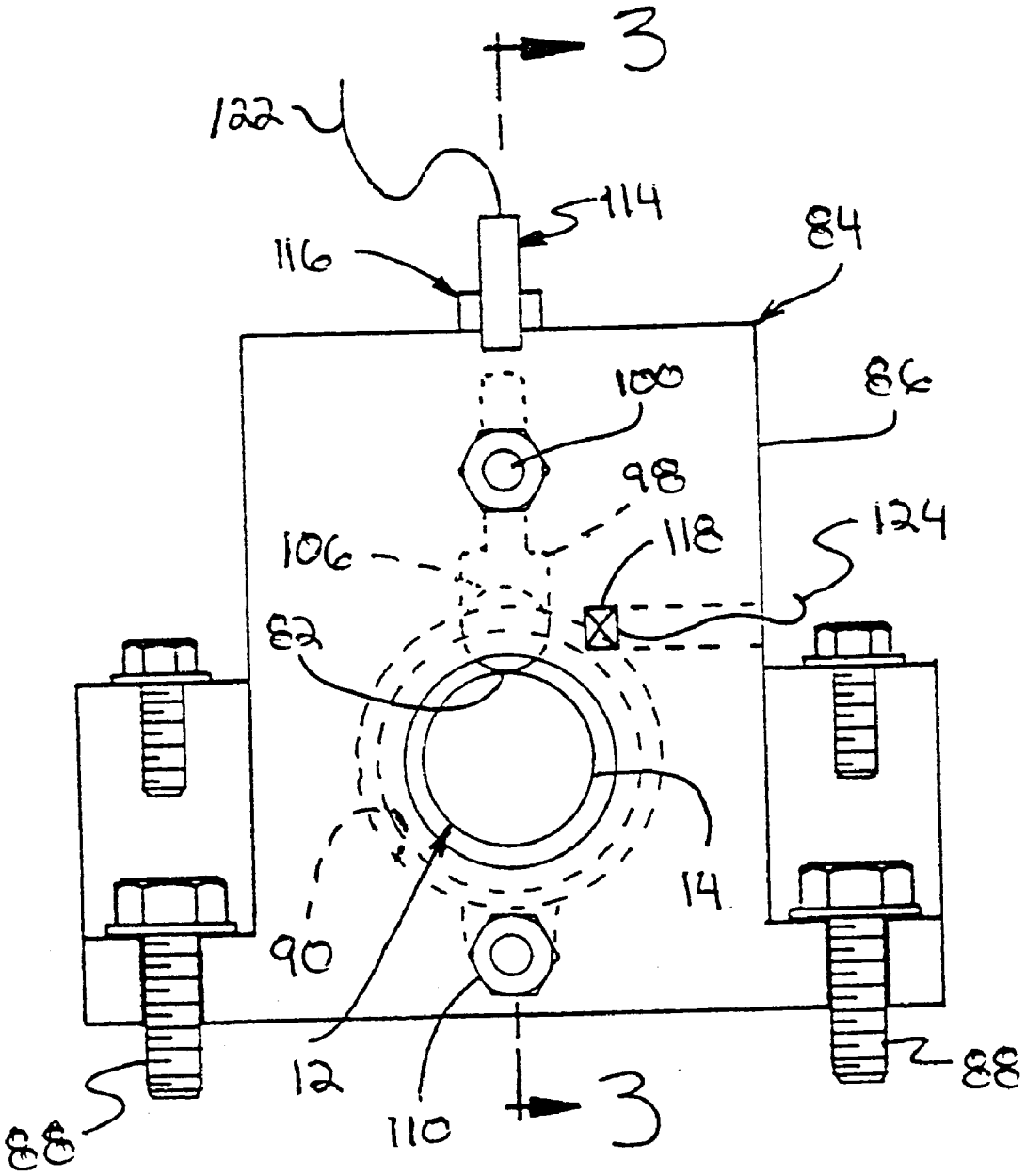
FIG. 2 is an end view of structure of the apparatus of FIG. 1 for creating a contact stress on the circumferential surface of the member.
Figure 3:
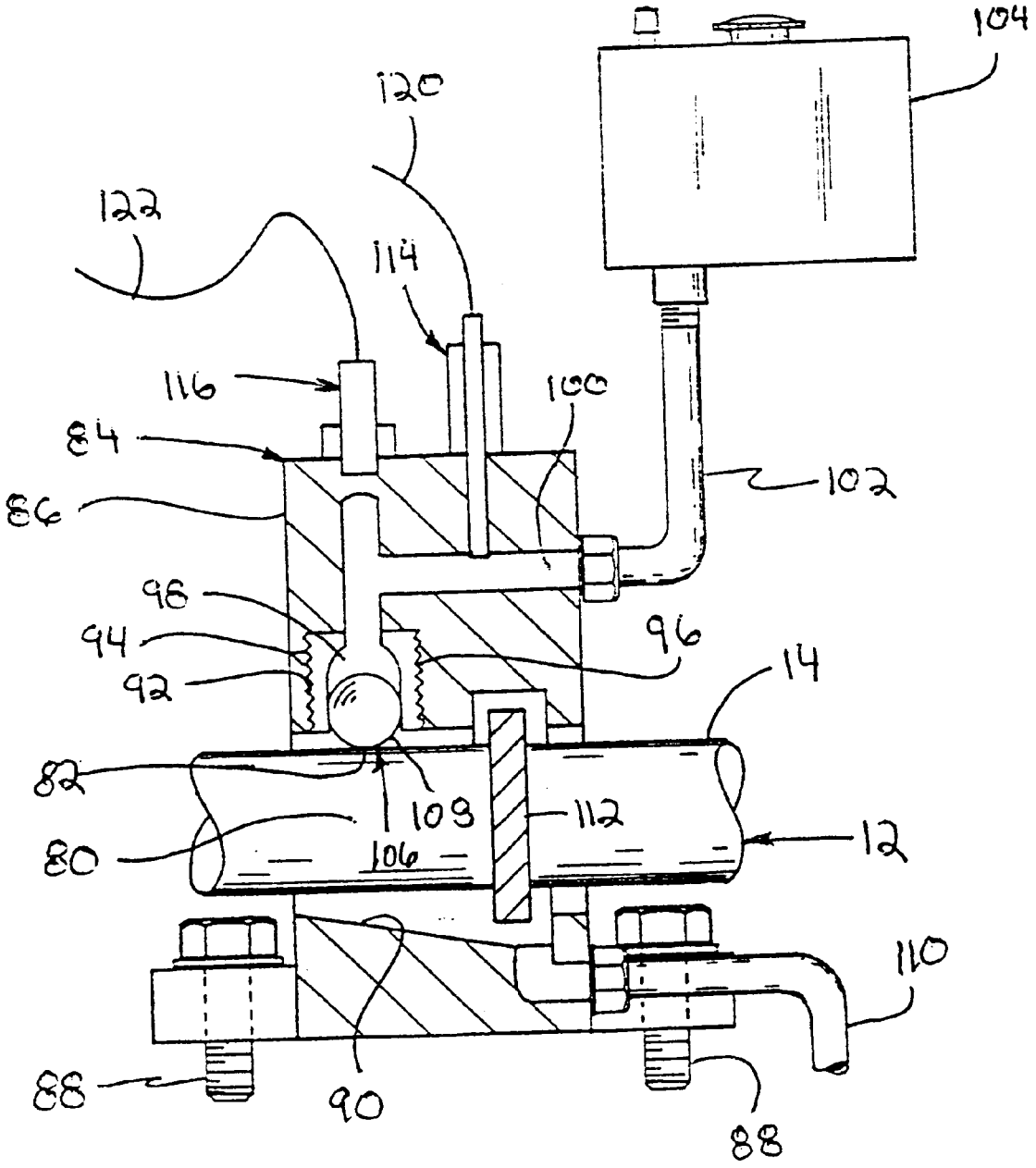
FIG. 3 is a cross-sectional view of the structure of FIG. 2.

Referring to FIGS. 2 and 3, apparatus 10 additionally includes structure 84 for creating a contact stress at location 82 on circumferential surface 14. Structure 84 includes a housing 86 mounted to frame 26 of structure 24 with bolts 88 in abutting relation to the bearing 28 closest to axial location 80 (FIG. 1). As best shown in FIG. 3, housing 86 has a passage 90 extending therethrough adapted for receiving member 12 for rotation therein, and a threaded sidewall 92 defining a cavity 94 adapted for threadedly receiving an insert 96 made from a self lubricating material such as Teflon® brand tetrafluoroethylene available from Dupont. Insert 96 includes a passage 98 therethrough in communication with passage 90 and with an oil passage 100 in fluid communication with an oil feed line 102 connected to housing 84 for delivering oil under pressure to passage 98 from a source of pressurized oil 104. A ball 106 having an outer circumferential surface 108 is supported by insert 96 in passage 98 for rotating contact with circumferential surface 14 during the rotation of member 12. Structure 84 includes suitable means for biasing ball 106 against member 12 during the rotating contact, to create a contact stress on circumferential surface 14 of member 12 at location 82. Such means can include, but are not limited to, oil under pressure (not shown) communicated from oil source 104 through oil feed line 102 and oil passage 100 to passage 98 and operable to bias ball 106 against member 12 during the rotation. Some of the oil will flow around circumferential surface 108 of ball 106 and between surface 106 and surface 14 to provide lubrication therebetween, the excess oil then flowing through passage 90 and exiting therefrom through an oil drain line 110 communicating passage 90 with a repository for the oil or a return line in communication with oil source 104 (not shown). An annular oil retainer 112 is mounted around circumferential surface 14 of member 12 to contain the oil in passage 90 and direct its flow into oil drain line 110. Other suitable means for biasing ball 106 against member 12 can include, for instance, a weight bearing downwardly against ball 106, a mechanical device such as a spring, other fluids acting against ball 106 such as air under pressure, and electromechanical devices such as a solenoid armature or the like.

The combination of the tensile stress condition applied at location 82 by structure 48 and the contact stress condition applied by ball 106 have been found to create an environment conducive to the onset of fatigue related damage and distress, particularly pitting, on surface 14. To determine the onset of the damage and evaluate its extent, various means can be used. Referring to FIGS. 2 and 3, such means can include a conventionally constructed and operable oil pressure transducer 114 in communication with oil passage 100 to sense variations in oil pressure resultant from skipping, bouncing and other movements of ball 106 indicative of changes in the condition of surface 14, such as pitting and the like. Also, such means can include a conventionally constructed and operable accelerometer 116 operable to sense vibrational movements of ball 106. Still further, a conventionally constructed and operable speed sensor 118 (FIG. 2) for magnetically or otherwise sensing variations in the rotational speed of ball 106 can be used for comparison with rotational speed of member 12, differences in such speeds evidencing changes in surface conditions. Information representative of such changing conditions can be communicated from a respective transducer 114, accelerometer 116 and/or speed sensor 118 to a data acquisition device in the conventional manner via wires 120, 122 and 124 in communication therewith.

Industrial Applicability

The present apparatus for initiating fatigue related damage on a circumferential surface of a rotatable member has utility for evaluating material properties, as well as the effects of lubricants used and additives thereto. The invention is particularly well suited for qualification of materials for use in gears, shafts and other componentry exposed under normal operating conditions to bending induced fatigue and contact stress.

Other aspects, objects and advantages of the present invention can be obtained from a study of the drawings, the disclosure and the appended claims.

We claim:

1. Apparatus for initiating fatigue related damage on a circumferential surface of a member, the circumferential surface extending around an axis of the member, the apparatus comprising:

structure for supporting the member for rotation about the axis;

structure for applying a load to the member during the rotation thereof to create a bending moment at a predetermined axial location on the member and a resultant tensile stress condition at a predetermined location on the circumferential surface thereof;

structure for creating a contact stress at the predetermined location on the circumferential surface of the member, including a member having a circumferential surface positioned for rotating contact with the circumferential surface of the first named member at the predetermined location, and means biasing the second named member against the first named member during the rotating contact.

2. Apparatus, as set forth in claim 1, wherein the structure for supporting the first named member comprises a plurality of aligned bearings.

3. Apparatus, as set forth in claim 1, wherein the structure for applying the load to the first named member comprises a load cell to allow determining the magnitude of the load applied.

4. Apparatus, as set forth in claim 3, wherein the structure for applying the load to the first named member further comprises a mechanism allowing varying the load.

5. Apparatus, as set forth in claim 1, further comprising a rotating power source for rotating the first named member.

6. Apparatus, as set forth in claim 1, wherein the means biasing the second named member against the first named member comprises a fluid under pressure in fluid communication with the second named member.

7. Apparatus, as set forth in claim 6, further comprising a pressure transducer in communications with the fluid under pressure operable for sensing pressure changes in the fluid resulting from pitting on the circumferential surface of at least one of the first named member and the second named member.

8. Apparatus, as set forth in claim 1, further comprising an accelerometer for detecting movements of the second named member indicative of pitting on the circumferential surface of at least one of the first named member and the second named member.

9. Apparatus, as set forth in claim 1, wherein the first named member comprises an elongated shaft having a first end, an opposite second end, and an intermediate portion located therebetween, the structure for supporting the first named member comprises a plurality of aligned bearings supporting the shaft adjacent the first end thereof, and the structure for applying the load comprises a load attached to the shaft adjacent the second end thereof.

10. Apparatus, as set forth in claim 1, wherein the second named member comprises a ball.

* * * * *